United States Patent
Duan et al.

(10) Patent No.: US 10,140,377 B2
(45) Date of Patent: Nov. 27, 2018

(54) DATA PROCESSING, DATA COLLECTION

(71) Applicant: INTERNATIONAL BUSINESS MACHINES CORPORATION, Armonk, NY (US)

(72) Inventors: Ning Duan, Shanghai (CN); Ke Hu, Beijing (CN); Zhi Hu Wang, Beijing (CN); Jian Ming Zhang, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 187 days.

(21) Appl. No.: 14/389,008

(22) PCT Filed: Mar. 19, 2013

(86) PCT No.: PCT/CN2013/072864
§ 371 (c)(1),
(2) Date: Sep. 29, 2014

(87) PCT Pub. No.: WO2013/143407
PCT Pub. Date: Oct. 3, 2013

(65) Prior Publication Data
US 2015/0066965 A1    Mar. 5, 2015

(30) Foreign Application Priority Data

Mar. 31, 2012    (CN) .......................... 2012 1 0092353

(51) Int. Cl.
*G06F 17/30* (2006.01)
*H04L 29/08* (2006.01)
*H04W 4/18* (2009.01)

(52) U.S. Cl.
CPC ........ *G06F 17/30876* (2013.01); *H04L 67/22* (2013.01); *H04W 4/185* (2013.01)

(58) Field of Classification Search
CPC ......... G06F 17/30569; G06F 17/30067; G06F 17/30286
See application file for complete search history.

(56) References Cited

U.S. PATENT DOCUMENTS 5,848,369 A    12/1998    Gerace
5,848,396 A    12/1998    Gerace
(Continued)

FOREIGN PATENT DOCUMENTS

CN    101504671 A    8/2009
CN    102023805 A    4/2011
(Continued)

OTHER PUBLICATIONS

Google, Mobile Tracking Overview, Accessed Feb. 18, 2012, website: http://code.google.com/apis/analytics/docs/mobile/overview.html.
(Continued)

*Primary Examiner* — Loc Tran
(74) *Attorney, Agent, or Firm* — Cantor Colburn LLP; David Quinn (57) ABSTRACT

Embodiments of the present invention generally relate to data processing and collection, further relate to a data processing method and a corresponding system, a data collecting method and a corresponding system. Particularly, the data processing method of the present invention comprises: obtaining position data; obtaining a position-function mapping relationship; and converting the position data into user behavior data according to the position-function mapping relationship. As compared to the prior art, at least one embodiment of the present invention has at least one of the following advantages: first, to collect user operations on a
(Continued)

mobile terminal in a non-intrusive manner; second, to facilitate analysis performed on various applications of the mobile terminal.

18 Claims, 3 Drawing Sheets

(56) References Cited

U.S. PATENT DOCUMENTS

| | | | |
|---|---|---|---|
| 2001/0056488 | A1* | 12/2001 | Maeda ................. G06Q 10/087 709/225 |
| 2004/0254942 | A1 | 12/2004 | Error et al. |
| 2007/0073581 | A1 | 3/2007 | Kempe et al. |
| 2008/0177994 | A1* | 7/2008 | Mayer .................. G06F 9/4418 713/2 |
| 2009/0094213 | A1* | 4/2009 | Wang ................. G06F 17/30867 |
| 2010/0041391 | A1 | 2/2010 | Spivey et al. |
| 2010/0070876 | A1 | 3/2010 | Jain et al. |
| 2010/0218112 | A1 | 8/2010 | Park et al. |
| 2010/0332550 | A1 | 12/2010 | Ainslie |
| 2010/0332962 | A1 | 12/2010 | Hammer et al. |
| 2011/0238496 | A1 | 9/2011 | Gurbuxani et al. |
| 2012/0096148 | A1* | 4/2012 | Manjunath ............ G06F 9/4443 709/224 |

FOREIGN PATENT DOCUMENTS

| | | |
|---|---|---|
| CN | 102023805 A | 4/2011 |
| CN | 102300022 A | 12/2011 |
| CN | 101777080 A | 7/2014 |
| WO | 2005038575 A2 | 4/2005 |

OTHER PUBLICATIONS

Informate Mobile Intelligence, Tracking Mobile Usage Gets Easy With Informate, Accessed Feb. 18, 2012, website: http://www.siliconindia.com/startup_company/Tracking_mobile_usage_gets_easy_with_informate/cmpid=100.html.
App Burts, LLC., AppBurst Integrates in App Usage Tracking and Analytics for iPhone Apps, Apps 4 Events, Dec. 12, 2010, Accessed Feb. 18, 2012, website: http://www.appsforevents.com/news-blog/iphone-app-usage-tracking-analytics.
Webtrents Inc., Mobile Analytics for Apps, http://webtrends.com/shared/datasheet/DS-MobileAppAnalytics.pdf.
Includeapp Ltd., Includeapp Ltd Launches the World's First Qt for Symbian in-app Analytics and Also Supports Android, Feb. 2, 2011, London, Accessed: Feb. 18, 2012, website: http://webcache.googleusercontent.com/search?q=cache:http://www.includeapp.com/press.php.
Falaki et al., Diversity in Smartphone Usage, MobiSys'10. Jun. 12-18. San Francisco, CA, USA, website: http://sing.stanford.edu/cs303-sp11/papers/falaki_diversity.pdf.
United Kingdom Patent Application No. GB1418070.7 Examination Report, dated Aug. 10, 2018.

\* cited by examiner

DATA PROCESSING, DATA COLLECTION

CROSS-REFERENCE TO RELATED APPLICATIONS

This application claims priority under 35 U.S.C. § 371 from PCT Application PCT/CN2013/072864, filed on Mar. 19, 2013, which claims priority from Chinese Patent Application No. 201210092353.X, filed on Mar. 31, 2012. The entire contents of both applications are incorporated herein by reference.

BACKGROUND

Embodiments of the present invention generally relate to data processing and data collection, and a more specifically, the embodiments of the present invention relate to a data process method and its corresponding system, and a data collecting method and its corresponding system.

Web user behavior analysis refers to, in the context of basic visits data obtained from websites, taking statistics and analysis on related data to find users' rules of visiting websites, and representing those rules and related data in the form of charts, etc. The contents of web user behavior analysis comprise user stay time, bounce rate of websites; difference in browsing custom between registered users and unregistered users; website paths visited by users; user visits at different times of a day, etc.

With the continuous abundance of mobile terminal applications, a great of demand has been recognized for performing user behavior analysis on applications installed on mobile terminals. These applications may comprise a webpage and other applications as well.

SUMMARY

Currently, more popular web user behavior analysis software comprises Google® Analytics, Analog®, Webalizer, etc. However, current software of web user behavior analysis only can analyze clicks on links (URLs), that is, only can perform statistical analysis on the URL level, instead of statistical analysis on finer granularity (for example, unable to count clicks on some buttons on a webpage). Besides, the current software of web user behavior analysis does not support non-webpage analysis (for example, unable to realize analysis with respect to other applications).

In order to perform user behavior analysis on applications of mobile terminals, some mobile terminal applications begin to add functions of user behavior analysis on those applications. However, all of these functions of user behavior analysis have their codes intrusively implanted in applications. That is, source codes of these applications must be modified in order to add functions of user behavior analysis. For example, codes must be added to record in a log file events triggered after a button is clicked. If an application does not additionally or systematically provided with corresponding functions of user behavior analysis when it is released, it is very difficult to supplement such functions of user behavior analysis later. Furthermore, the current intrusive method only can add functions of user behavior analysis for each application individually and thus can not be commonly applied to all applications.

In order to address one or more problems in the prior art, the present invention provides a more effective solution of collecting and processing data for subsequent analysis on a mobile terminal.

A data processing method is provided in the present invention. The method comprises obtaining position data, the position data comprising a position of an operation performed by a user on a screen of a mobile terminal; obtaining a position-function mapping relationship, the position-function mapping relationship comprising correspondence between the position on the screen of the mobile terminal and a function of an application; and converting the position data into user behavior data according to the position-function mapping relationship, the user behavior data comprising the function of the application operated by the user on the screen of the mobile terminal.

A data collecting method is further provided in the present invention. The method comprises monitoring an operation performed by a user on a screen of a mobile terminal; recording the position of the operation performed by the user on the screen of the mobile terminal as position data; and sending the position data to convert the position data into user behavior data according to a position-function mapping relationship, wherein the position-function mapping relationship comprises correspondence between the position on the screen of the mobile terminal and a function of an application, the user behavior data comprises the function of the application operated by the user on the screen of the mobile terminal.

A data processing system is further provided in the present invention. The system comprises first obtaining means, configured to obtain position data, the position data comprising a position of an operation performed by a user on a screen of a mobile terminal; second obtaining means, configured to obtain a position-function mapping relationship, the position-function mapping relationship comprising correspondence between the position on the screen of the mobile terminal and a function of an application; and first conversion means, configured to convert the position data into user behavior data according to the position-function mapping relationship, the user behavior data comprising the function of the application operated by the user on the screen of the mobile terminal.

A data collection system is further provided in the present invention. The system comprises monitoring means, configured to monitor an operation performed by a user on a screen of a mobile terminal; recording means, configured to record the position of the operation performed by the user on the screen of the mobile terminal as position data; and sending means, configured to send the position data to convert the position data into user behavior data according to a position-function mapping relationship, wherein the position-function mapping relationship comprises correspondence between the position on the screen of the mobile terminal and a function of an application, the user behavior data comprises the function of the application operated by the user on the screen of the mobile terminal.

Compared to the prior art, at least one embodiment of the present invention has at least one of the following advantages: first, to collect user operations on a mobile terminal in a non-intrusive manner (that is, without modifying application codes); second, to facilitate analysis performed on various applications of the mobile terminal (not only webpages), so that analysis can be realized in finer granularity (instead of only on the URL level).

In the detailed description of specific embodiments hereinafter, the above and other advantages will be described in detail in connection with more particular embodiments.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

Figure 1:
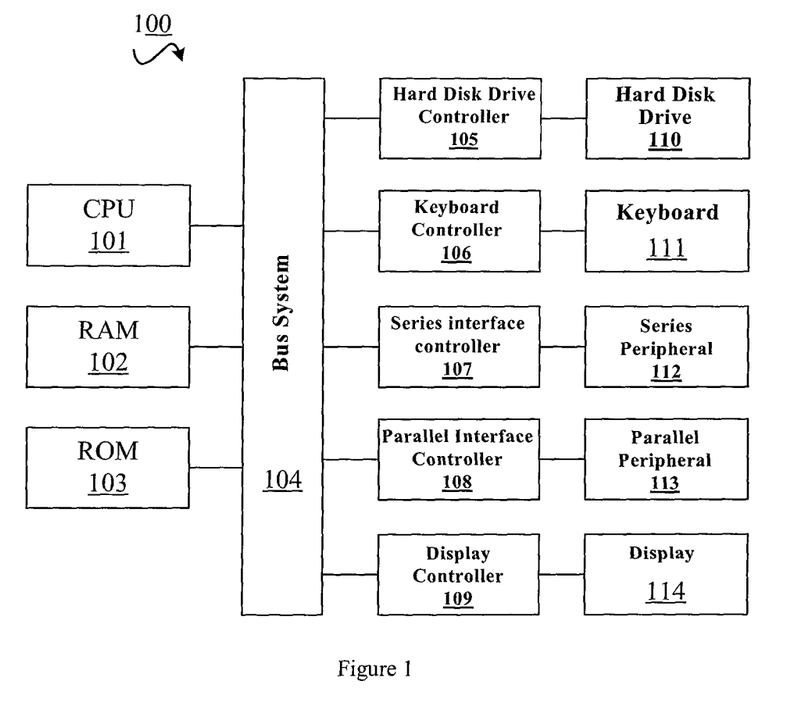
FIG. 1 shows a block diagram of an exemplary computing system suitable for the application of an embodiment of the present invention.

FIG. 1 shows an exemplary computer system 100 which is applicable to implement the embodiments of the present invention. As shown in FIG. 1, the computer system 100 may include: CPU (Central Process Unit) 101, RAM (Random Access Memory) 102, ROM (Read Only Memory) 103, System Bus 104, Hard Drive Controller 105, Keyboard Controller 106, Serial Interface Controller 107, Parallel Interface Controller 108, Display Controller 109, Hard Drive 110, Keyboard 111, Serial Peripheral Equipment 112, Parallel Peripheral Equipment 113 and Display 114. Among above devices, CPU 101, RAM 102, ROM 103, Hard Drive Controller 105, Keyboard Controller 106, Serial Interface Controller 107, Parallel Interface Controller 108 and Display Controller 109 are coupled to the System Bus 104. Hard Drive 110 is coupled to Hard Drive Controller 105. Keyboard 111 is coupled to Keyboard Controller 106. Serial Peripheral Equipment 112 is coupled to Serial Interface Controller 107. Parallel Peripheral Equipment 113 is coupled to Parallel Interface Controller 108. And, Display 114 is coupled to Display Controller 109. It should be understood that the structure as shown in FIG. 1 is only for the exemplary purpose rather than any limitation to the present invention. In some cases, some devices may be added to or removed from the computer system 100 based on specific situations.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
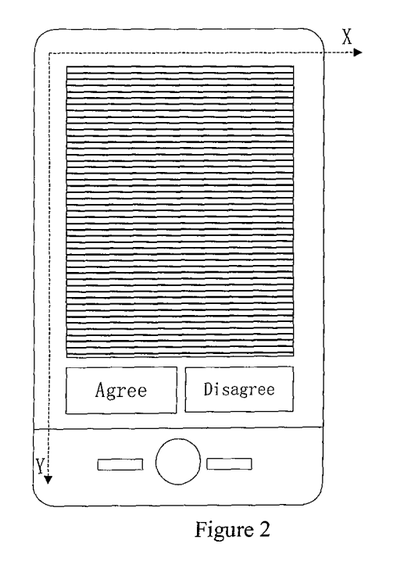
FIG. 2 shows a schematic diagram of an application on a mobile terminal.

FIG. 2 shows a schematic diagram of an application on a mobile terminal. Supposed an application is opened on a mobile phone of a user, which displays a segment of text, and two buttons beneath the text. The application wants to count the numbers of clicks on the two buttons. Wherein, a X axis and a Y axis shown by dashed lines represent coordinate axes on the screen of the mobile terminal.

If the application is a web browser, the text described above is text on a webpage, and existing web application analytics software is unable to realize analysis described above, because existing web application analytics software only can take statistics of clicks on URLs, instead of statistics of clicks at finer granularity (for example, clicks on buttons).

If the application is another one rather than a web browser, in the prior art, clicks on each button only can be recorded through modifying the codes of the application in an intrusive manner. If a certain button is omitted to be recorded when the application is developed, or if it is not designed to record button-click events when the application was developed, and the application has been released, it is difficult to collect user click data in a non-intrusive manner.

Note although a description will be given taking a mobile phone as an example in the present invention, the present invention is not limited to data collection and processing on a mobile phone, and is applicable to a palm computer, a tablet computer, and other mobile terminals. Further, the screen of the mobile terminal in the present invention may be a touch screen or a non-touch screen.

Figure 3:
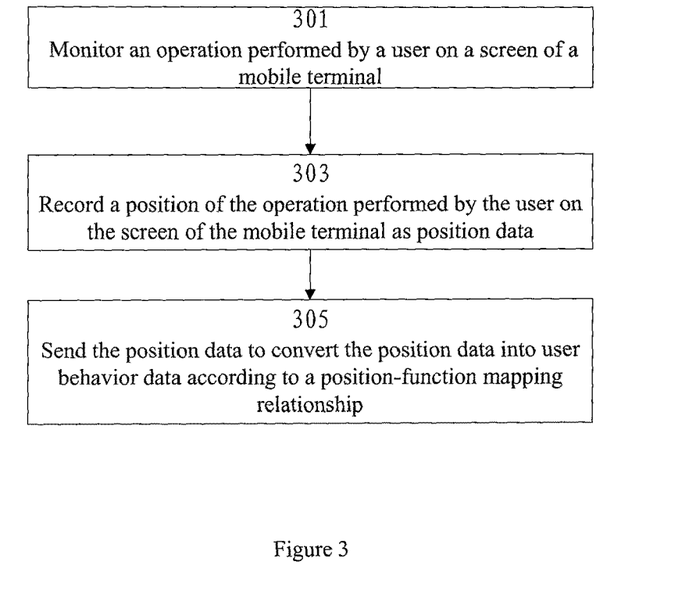
FIG. 3 shows a flowchart of a data collecting method according to an embodiment of the present invention.

FIG. 3 shows a flowchart of a data collecting method according to an embodiment of the present invention. At step 301, operations performed by a user on the screen of a mobile terminal are monitored. At step 303, the positions of the operations performed by the user on the screen of the mobile terminal are recorded as position data; and at step 305, the position data is sent for being converted into user behavior data according to a position-function mapping relationship, wherein the position-function mapping relationship comprises correspondence between positions on the screen of the mobile terminal and application functions, and the user behavior data comprises a function of the application operated by the user on the screen of the mobile terminal.

Below, each step of FIG. 3 will be described in sequence. First of all, operations performed by a user on the screen of the mobile terminal are monitored. Taking a touch screen as example, operations on the mobile terminal performed by a user may comprise multiple types of operations, such as, user's touch on the touch screen (without releasing or dragging), clicking on the touch screen and then releasing, user's contacting and sliding on the touch screen, etc.

At step 303, the positions of the operations on the screen of the mobile terminal performed by the user are recorded as position data. Operation systems of many mobile terminals themselves have such a function of recording coordinates of user operations on touch screens. For example, in the Android® system, the x, y coordinate values of a current screen area operated by a user can be obtained through "float x=event.getX( );float y=event.getY( )". The x, y coordinate values can be directly used as the position data or part of the position data, or the x, y coordinate values can be further processed (for example, they can be converted into a percentage of relative positions with respect to the X axis and the Y axis of the screen), and the result of the process can be used as the position data or part of the position data. According to one embodiment of the present invention, the position data may comprise at least one of a user ID, an application ID, a screen ID, a model of the screen of the mobile terminal, and a coordinate of an operation performed by a user on the screen of the mobile terminal. Wherein, the operation on the screen of the mobile terminal performed by a user comprises user's clicking on the touch screen and then releasing. One example of the position data is shown in Table 1 below.

TABLE 1

| Screen model of mobile terminal | User ID | Application ID | Screen ID | operation coordinate |
|---|---|---|---|---|
| XYZ001 | TOM | 1001 | 1 | X = 20, Y = 95 |

In table 1, the screen model of the mobile terminal can be used to distinguish different models of screens of different mobile terminals, comprising different screen sizes, different resolutions and other information. The user ID is used to identify a certain user. The application ID is used to identify the application that is currently operated. According to one embodiment of the present invention, an opened application can be recorded in the form of a stack. That is, in response to the open of a new application, the application ID of the new application is added into a stack, and in response to the close of an application, the application ID that is lastly recorded in the stack is removed. In some cases, an application may comprise several screen display pages. In such cases, each screen page is assigned with an identifier number, i.e. a screen ID. The operation coordinate represents the position of the operation performed by the user on the screen of the mobile terminal.

According to different cases, the contents of Table 1 may be simplified. Optionally, since the position data may be ultimately used by users to perform application statistical analysis, if the statistic of user ID is not needed in the statistical analysis, the user ID may be excluded from the position data. Likewise, optionally, if statistics will be taken on applications on a single model of mobile terminal screen, or mobile terminals having a unique screen model, the mobile terminal screen ID may be excluded from the position data. Optionally, if statistics will be taken on only one page of an application (for example, there are not other screen pages, or no other screen pages need to be analyzed), the screen ID can be excluded from the position data.

Optionally, if statistics will be taken on only one application, the application ID may be excluded from the position data.

In other embodiments, the contents of Table 1 can be further detailed to include other information. For example, it may also comprise user profile information, user stay time on a certain screen, whether or not a successful response has been made to a user operation, etc.

Note that the present invention does not have limitations on the data structure of the position data, which may be represented in a form, string, and any other data structure.

At step 305, the position data is sent to be converted into user behavior data according to a position-function mapping relationship, wherein the position-function mapping relationship comprises correspondence between positions on the screen of the mobile terminal and application functions, and the user behavior data comprises the function of the application operated by the user on the screen of the mobile terminal. The sending step may comprise sending the position data to a local data processing system, or sending the position data to a data processing system located on a remote server. If the position data will be sent to a local (on the mobile terminal) data processing system, the position data can be locally converted into user behavior data according to a position-function mapping relationship. If the position data will be sent to a data processing system located on a remote server, the position data can be converted into user behavior data according to a position-function mapping relationship on the remote server. Computing and storage resources on the mobile terminal can be further saved through performing the conversion on the remote server.

How to convert position data into user behavior data according to a position-function mapping relationship will be described in more detail hereinafter.

According to one embodiment of the present invention, the sending the position data further comprises sending the position data in response to the close of the application by the user. For example, all positions of all clicks of the user during one visit on the application can be packaged and sent. Thus, if the position data is sent to the remote server, network resources can be used more effectively, and network data transmission can be reduced.

Figure 4:
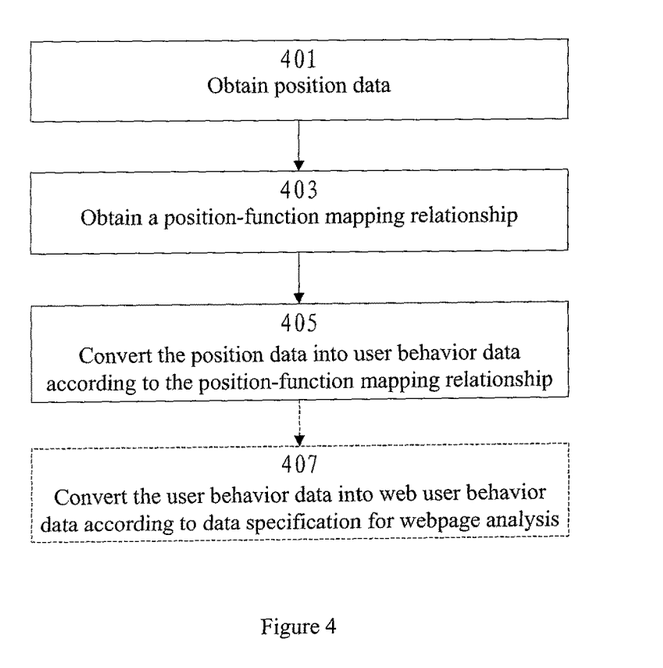
FIG. 4 shows a flowchart of a data processing method according to an embodiment of the present invention.

FIG. 4 shows a flowchart of a data processing method according to an embodiment of the present invention. At step 401, position data is obtained, wherein the position data comprises positions of operations performed by a user on the screen of a mobile terminal. The position data is identical to the position data described above. At step 403, a position-function mapping relationship is obtained, wherein the position-function mapping relationship comprises correspondence between positions on the screen of the mobile terminal and application functions. At step 405, the position data is converted into user behavior data according to the position-function mapping relationship, wherein the user behavior data comprises the function of the application operated by the user on the screen of the mobile terminal.

Below, steps of FIG. 4 will be described in detail. At step 403, a position-function mapping relationship is obtained, wherein the position-function mapping relationship comprises correspondence between positions on the screen of the mobile terminal and application functions. According to one embodiment of the present invention, the position-function mapping relationship further comprises at least one item of an application ID, a screen ID, a screen model of mobile terminal, a function ID, a function title, and a function-corresponding-coordinate region. In one example, the position-function mapping relationship may be as shown in Table 2 below.

TABLE 2

| screen model of mobile terminal | Application ID | Screen ID | Function ID | Function title | Corresponding coordinate region |
|---|---|---|---|---|---|
| XYZ001 | 1001 | 1 | 1 | Agree button | X[10,50] Y[90,100] |

In table 2, the screen model of the mobile terminal can be used to distinguish different models of screens of different mobile terminals, comprising different screen sizes, different resolutions and other information. The application ID is used to identify an application. The screen ID is used to identify a certain screen of the application. The function ID and the function title are used to identify a function of the application on the screen (for example, an "Agree" button of FIG. 2). The function ID is represented in the form of a code, and the function title is represented in the form of characters. The function-corresponding-coordinate region represents a coordinate region corresponding to the function. For example, the "Agree" button of FIG. 2 corresponds to a region ranging from 10 to 50 on the X axis, and ranging from 90 to 100 on the Y axis. The above position-function mapping relationship may be provided by the application, or can be obtained through automatic analysis of analysis software, and the present invention does not have limitations on the source of the position-function mapping relationship.

According to different cases, the contents of Table 2 may be simplified. Optionally, if statistics will be taken on an application on a single screen model of mobile terminal, or those mobile terminals have a unique screen model, the mobile terminal screen ID may be excluded from the position-function mapping relationship. Optionally, if statistics will be taken on only one page of the application (for example, there are not other screen pages, or no other screen pages need to be analyzed), the screen ID can be excluded from the position-function mapping relationship. Optionally, if statistics will be taken on only one application, application ID may be excluded from the position-function mapping relationship. Optionally, the function ID and the function title have substantially the same function in the present invention, and it is possible to only remain one of them. Optionally, the function-corresponding-coordinate region is a range of coordinates of a region corresponding to the function, or a result of a further process of the range of coordinates (for example, x, y coordinate can be converted into a percentage of relative positions with respect to the X axis and the Y axis of the screen). Further, optionally, the function-corresponding-coordinate region can be represented by digits or a figure.

The contents of Table 2 can be further detailed to include other information as needed.

Note that the present invention does not have limitations on the data structure of the position-function mapping relationship, which may be represented in a form, string, and any other data structure.

Furthermore, it will be mentioned that the present invention does not have limitations on the source of the position-function mapping relationship, and the position-function mapping relationship obtained at step 403 can be accessed locally or remotely.

Furthermore, the present invention does not have limitations on the execution sequence of steps 401 and 403. In other words, step 401 can be executed before step 403 or after step 403, or the two steps can be executed concurrently.

At step 405, the position data is converted into user behavior data according to the position-function mapping relationship, wherein the user behavior data comprises the function of the application operated by the user on the screen of the mobile terminal. According to an embodiment of the present invention, the user behavior data comprises at least one of a user ID, an application ID, a screen ID, a screen model of mobile terminal, a function ID, and a function title. In one example, the user behavior data may be as shown in Table 3 below.

TABLE 3

| User ID | Application ID | Screen ID | Function ID | Function title | Screen model of mobile terminal |
|---|---|---|---|---|---|
| Tom | 1001 | 1 | 1 | Agree button | XYZ001 |

The user ID, application ID, screen ID, screen model of mobile terminal, function ID, function title in Table 3 have the same meanings as that described above, and will not be described in detail. Note that, for the same screen page of the same application, the coordinate of an operation performed by a user on the screen of the mobile terminal in the position data and the function-corresponding-coordinate region in the position-function mapping relationship are further compared at step 405. If the coordinate of the operation performed by the user on the screen of the mobile terminal falls within the coordinate region (for example, in the above example, the coordinate "x=20, y=95" falls within the range "x[10,50], y[90, 100]"), it indicates that the user has operated a function corresponding to the coordinate region (such as a click operation), then the position data is further converted into user behavior data.

According to different cases, the contents of Table 3 may be simplified. Optionally, if the statistic of user ID is not needed in the statistical analysis, the user ID may be excluded from the user behavior data. Optionally, if statistics will be taken on only one page of an application (for example, there are not other screen pages, or no other screen pages need to be analyzed), the screen ID can be excluded from the user behavior data. Optionally, if statistics will be taken on only one application, the application ID may be excluded from the user behavior data. Optionally, the function ID and the function title have substantially the same function in the present invention, and it is possible to only remain one of them. Optionally, if statistics will be taken on applications on a single screen model of mobile terminal, or those mobile terminals have a unique screen model, the mobile terminal screen ID may also be excluded from the user behavior data.

Optionally, the contents of Table 3 can be further detailed to include other information, for example, user profile information may be added, such that it is possible to analyze what application functions each group of users inclines to; also, user stay time on a certain screen page may be added to facilitate subsequent analysis and statistics on user visit time; further, whether a user operation has been responded successively can be added for subsequent statistics on the probability of visit errors.

Note that the present invention does not have limitations on the data structure of the position data, the user behavior data may be represented in a form, string, and any other data structure.

Optionally, FIG. 4 may further comprise step 407 to convert the user behavior data into Web user behavior data according to data specification for webpage analysis, which comprises the types of input data required by webpage analysis. According to one embodiment of the present invention, in order to employ existing web user behavior analysis software (for example, Google Analytics) to analyze data of applications on a mobile terminal, the user behavior data needs to be converted into the web user behavior data according to the specification for input data (that is, web user behavior data) of web user behavior analysis software.

According to an embodiment of the present invention, the converted web user behavior data may be as shown in Table 4 below.

TABLE 4

| Visitor IP | page view URL | page title | Page request status | Browser model |
|---|---|---|---|---|
| User ID | Application ID + screen ID + function ID | Application ID + screen ID + function title | user operation response status | Screen model of mobile terminal |

The first row of table 4 represents data types in the data specification for webpage analysis, the second row represents corresponding items in the user behavior data. The data specification for webpage analysis in Table 4 comprises a visitor IP, and step 407 further comprises using a user ID (such as mobile phone number) as the visitor IP in the web user behavior data. The data specification for webpage analysis in Table 4 comprises a page view URL, and step 407 further comprises using a function of an application on the mobile terminal (comprising an application ID, a screen ID and a function ID) as the page view URL in the web user behavior data. The data specification for webpage analysis in Table 4 comprises a page title, and step 407 further comprises using a function of an application on the mobile terminal (comprising an application ID, a screen ID and a function title) as the page title in the web user behavior data. The data specification for webpage analysis in Table 4 comprises a page request status, and step 407 further comprises using the user operation response status as the page request status in the web user behavior data. The data specification for webpage analysis in Table 4 comprises a browser model, and step 407 further comprises using the screen model of mobile terminal as the browser model in the web user behavior data.

According to different cases, the specific contents of Table 4 may be further detailed. For example, operation system, visit time, and the like also can be comprised in Table 4.

According to an embodiment of the present invention, the data processing method may further analyze visits to applications by users (not shown in the figure). The analysis on user visits to applications by users may comprise analyzing visits to applications by users based on the user behavior data, and/or analyzing visits to applications by users based on the web user behavior data by web user behavior analysis software.

A data collecting method and a data processing method of the present invention have been described above. Below, under the same inventive concept, a data collecting system and a data processing system will be described with reference to FIGS. 5 and 6, wherein the same or corresponding details have been particularly and completely described above, and will not be repeated in detail hereinafter.

Figure 5:
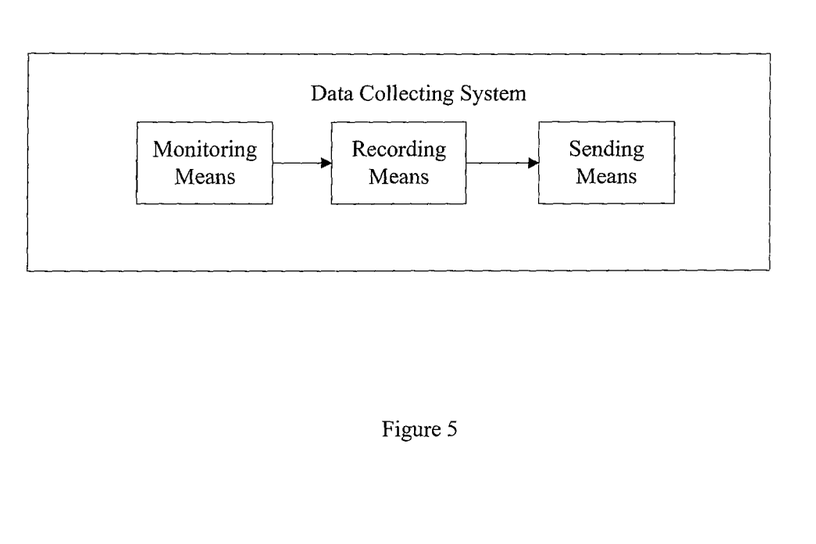
FIG. 5 shows a block diagram of a data collecting system according to an embodiment of the present invention.

FIG. 5 shows a block diagram of a data collecting system according to an embodiment of the present invention. The data collecting system of FIG. 5 comprises monitoring means, recording means, and sending means. Wherein, the monitoring means is configured to monitor operations performed by a user on the screen of a mobile terminal. The recording means is configured to record positions of operations performed by the user on the screen of the mobile terminal as position data. The sending means is configured to send the position data to convert the position data into user behavior data according to a position-function mapping relationship, wherein the position-function mapping relationship comprises correspondence between positions on the screen of the mobile terminal and application functions, the user behavior data comprises the function of the application operated by the user on the screen of the mobile terminal.

According to an embodiment of the present invention, the position data further comprises at least one of a user ID, a screen ID, a screen model of mobile terminal, and a coordinate of an operation performed by a user on the screen of the mobile terminal.

According to an embodiment of the present invention, the sending means is further configured to send the position data in response to the close of an application.

Figure 6:
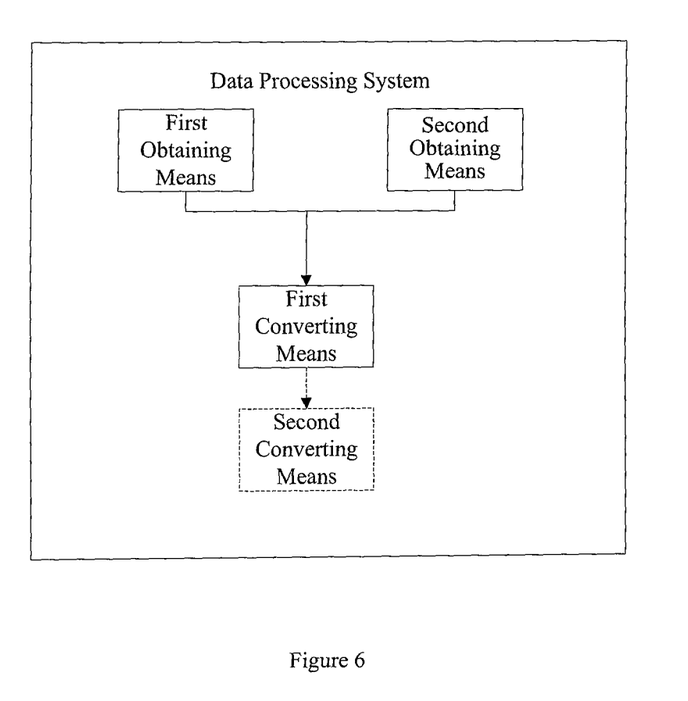
FIG. 6 shows a block diagram of a data processing system according to an embodiment of the present invention.

FIG. 6 shows a block diagram of a data processing system according to an embodiment of the present invention. The data processing system of FIG. 6 comprises first obtaining means, second obtaining means, and first conversion means. Wherein, the first obtaining means is configured to obtain position data, the position data comprising positions of operations performed by a user on the screen of the mobile terminal. The second obtaining means is configured to obtain a position-function mapping relationship, the position-function mapping relationship comprising correspondence between positions on the screen of the mobile terminal and application functions. The first conversion means is configured to convert the position data into user behavior data according to the position-function mapping relationship, wherein the user behavior data comprising the function of the application operated by the user on the screen of the mobile terminal.

According to an embodiment of the present invention, the position data further comprises at least one of a user ID, an application ID, a screen ID, a screen model of mobile terminal, and a coordinate of an operation performed by a user on the screen of the mobile terminal.

According to an embodiment of the present invention, the user behavior data further comprises at least one of a user ID, an application ID, a screen ID, a screen model of mobile terminal, a function ID, and a function title.

According to an embodiment of the present invention, the data processing system may further comprise second conversion means, which is configured to convert the user behavior data into web user behavior data according to data specification for webpage analysis, the data specification for webpage analysis comprising types of input data required by webpage analysis.

According to an embodiment of the present invention, the second conversion means is further configured to use a function of an application on the screen of the mobile terminal as a page URL in the web user behavior data.

According to an embodiment of the present invention, the data processing system further comprises analysis means, which is configured to analyze visits to the application by the user. According to another embodiment of the present invention, the data processing system does not comprise analysis means, and user visits to the application are analyzed by another system.

According to an embodiment of the present invention, the data collecting system shown in FIG. 5 and the data processing system shown in FIG. 6 can be physically coupled with each other; according to another embodiment of the present invention, the data collecting system shown in FIG. 5 and the data processing system shown in FIG. 6 can be connected through the Internet.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for data processing, the method comprising:

obtaining a position data, wherein the position data comprises an indication of a plurality of positions corresponding to a plurality of operations performed by a user on a screen of a mobile terminal, wherein the plurality of operations is associated with an application executing on the mobile terminal;

obtaining a position-function mapping relationship, wherein the position-function mapping relationship comprises a correspondence between an x-y coordinate region of the screen of the mobile terminal and a function of the application executing on the mobile terminal, wherein the function of the application is initiated by user interaction with the screen of the mobile terminal within the x-y coordinate region, and wherein at least one position of the plurality of positions is contained within the x-y coordinate region;

converting the position data into a user behavior data according to the position-function mapping relationship, wherein the user behavior data comprises a function description field that provides an indication of the function of the application that is initiated by at least one operation of the plurality of operations that corresponds to the at least one position, the function description field comprising an identifier of the application, an identifier of a screen of the mobile terminal, and a title of the function of the application, and wherein the user behavior data further comprises an operation response status field comprising an indication of whether the mobile terminal successfully performed the function of the application in response to the at least one operation; and converting the user behavior data into a web user behavior data according to a data specification for a webpage analysis, wherein the data specification for webpage analysis comprises a plurality of types of input data required by the webpage analysis.

2. The computer-implemented method according to claim 1, wherein the step of converting the user behavior data into the web user behavior data according to data specification for the webpage analysis comprises:

using the function of the application of the mobile terminal as a page URL in the web user behavior data.

3. The computer-implemented method according to claim 1, further comprising:

analyzing a visit to the application by the user.

4. The computer-implemented method according to claim 1, wherein the position data further comprises at least one of a user ID, an application ID, a screen ID, a model of the screen of the mobile terminal, and a coordinate of an operation performed by a user on the screen of the mobile terminal.

5. The computer-implemented method according to claim 1, wherein the user behavior data comprises at least one of a user ID, an application ID, a screen ID, a screen model of mobile terminal, a function ID, and a function title.

6. A computer-implemented method for data collecting, the method comprising:

monitoring a plurality of operations performed by a user on a screen of a mobile terminal, wherein the plurality of operations is associated with an application executing on the mobile terminal;

recording a plurality of positions corresponding to the plurality of operations performed by the user on the screen of the mobile terminal as a position data;

determining that the application has been closed;

sending the position data responsive to determining that the application has been closed to convert the position data into a user behavior data according to a position-function mapping relationship; and converting the user behavior data into a web user behavior data according to a data specification for a webpage analysis, wherein the data specification for webpage analysis comprises a plurality of types of input data required by the webpage analysis, wherein the position-function mapping relationship comprises a correspondence between an x-y coordinate region of the screen of the mobile terminal and a function of the application executing on the mobile terminal, wherein the function of the application is initiated by user interaction with the screen of the mobile terminal within the x-y coordinate region, wherein at least one position of the plurality of positions is contained within the region, wherein the user behavior data comprises a function description field that provides an indication of the function of the application that is initiated by at least one operation of the plurality of operations that corresponds to the at least one position, the function description field comprising an identifier of the application, an identifier of a screen of the mobile terminal, and a title of the function of the application, and wherein the user behavior data further comprises an operation response status field comprising an indication of whether the mobile terminal successfully performed the function of the application in response to the at least one operation.

7. The computer-implemented method according to claim 6, wherein the position data further comprises at least one of a user ID, an application ID, a screen ID, a model of the screen of the mobile terminal, and a coordinate of an operation performed by a user on the screen of the mobile terminal.

8. The computer-implemented method according to claim 6, wherein the step of sending the position data to convert the position data into the user behavior data according to the position-function mapping relationship further comprises:

sending the position data in response to the close of the application by the user.

9. A data processing system for processing data, the data processing system comprising:

a memory;

a processor communicatively coupled to the memory; and a data processing module communicatively coupled to the memory and the processor, wherein the data processing module is configured to perform the steps of a method comprising:

obtaining a position data, wherein the position data comprises an indication of a plurality of positions corresponding to a plurality of operations performed by a user on a screen of a mobile terminal, wherein the plurality of operations is associated with an application executing on the mobile terminal, wherein the position data is obtained responsive to closing of the application;

obtaining a position-function mapping relationship, wherein the position-function mapping relationship comprises a correspondence between an x-y coordinate region of the screen of the mobile terminal and a function of the application executing on the mobile terminal, wherein the function of the application is initiated by user interaction with the screen of the mobile terminal within the x-y coordinate region, and wherein at least one position of the plurality of positions is contained within the x-y coordinate region;

converting the position data into a user behavior data according to the position-function mapping relationship, wherein the user behavior data comprises a function description field that provides an indication of the function of the application that is initiated by at least one operation of the plurality of operations that corresponds to the at least one position, the function description field comprising an identifier of the application, an identifier of a screen of the mobile terminal, and a title of the function of the application, and wherein the user behavior data further comprises an operation response status field comprising an indication of whether the mobile terminal successfully performed the function of the application in response to the at least one operation; and converting the user behavior data into a web user behavior data according to a data specification for a webpage analysis, wherein the data specification for webpage analysis comprises a plurality of types of input data required by the webpage analysis.

10. The data processing system according to claim 9, wherein the step of converting the user behavior data into the web user behavior data according to data specification for the webpage analysis comprises:
using the function of the application of the mobile terminal as a page URL in the web user behavior data.

11. The data processing system according to claim 9, the method further comprising:
analyzing a visit to the application by the user.

12. The data processing system according to claim 9, wherein the position data further comprises at least one of a user ID, an application ID, a screen ID, a model of the screen of the mobile terminal, and a coordinate of an operation performed by a user on the screen of the mobile terminal.

13. The data processing system according to claim 9, wherein the user behavior data comprises at least one of a user ID, an application ID, a screen ID, a screen model of mobile terminal, a function ID, and a function title.

14. A data collection system for collecting data, the data collection system comprising:
a memory;
a processor communicatively coupled to the memory; and
a data collection module communicatively coupled to the memory and the processor, wherein the data collection module is configured to perform the steps of a method comprising:
monitoring a plurality of operations performed by a user on a screen of a mobile terminal, wherein the plurality of operations is associated with an application executing on the mobile terminal;
recording a plurality of positions corresponding to the plurality of operations performed by the user on the screen of the mobile terminal as a position data;
determining that the application has been closed;
sending the position data responsive to determining that the application has been closed to convert the position data into a user behavior data according to a position-function mapping relationship; and
converting the user behavior data into a web user behavior data according to a data specification for a webpage analysis, wherein the data specification for webpage analysis comprises a plurality of types of input data required by the webpage analysis,
wherein the position-function mapping relationship comprises a correspondence between an x-y coordinate region of the screen of the mobile terminal and a function of the application executing on the mobile terminal, wherein the function of the application is initiated by user interaction with the screen of the mobile terminal within the x-y coordinate region, wherein at least one position of the plurality of positions is contained within the x-y coordinate region, wherein the user behavior data comprises a function description field that provides an indication of the function of the application that is initiated by at least one operation of the plurality of operations that corresponds to the at least one position, the function description field comprising an identifier of the application, an identifier of a screen of the mobile terminal, and a title of the function of the application, and wherein the user behavior data further comprises an operation response status field comprising an indication of whether the mobile terminal successfully performed the function of the application in response to the at least one operation.

15. The data collection system according to claim 14, wherein the position data further comprises at least one of a user ID, an application ID, a screen ID, a model of the screen of the mobile terminal, and a coordinate of an operation performed by a user on the screen of the mobile terminal.

16. The data collection system according to claim 14, wherein the step of sending the position data to convert the position data into the user behavior data according to the position-function mapping relationship further comprises:
sending the position data in response to the close of the application by the user.

17. A non-transitory readable storage medium tangibly embodying a computer readable program code having computer readable instructions which, when implemented, cause a computer device to carry out the steps of the method according to claim 1.

18. A non-transitory readable storage medium tangibly embodying a computer readable program code having computer readable instructions which, when implemented, cause a computer device to carry out the steps of the method according to claim 6.

* * * * *